US009977414B2

(12) United States Patent
Celli et al.

(10) Patent No.: US 9,977,414 B2
(45) Date of Patent: May 22, 2018

(54) NETWORK CONNECTED WEIGHT TRACKING SYSTEM FOR A WASTE DISPOSAL MACHINE

(71) Applicant: BIOHITECH AMERICA, Chestnut Ridge, NY (US)

(72) Inventors: Frank E. Celli, Montvale, NJ (US); Robert Joyce, Mechanicsburg, PA (US); William Kratzer, Harrisburg, PA (US); Ryan Bohn, Elizabethtown, PA (US)

(73) Assignee: BIOHITECH AMERICA, Chestnut Ridge, NY (US)

( * ) Notice: Subject to any disclaimer, the term of this patent is extended or adjusted under 35 U.S.C. 154(b) by 557 days.

(21) Appl. No.: 14/595,530

(22) Filed: Jan. 13, 2015

(65) Prior Publication Data

US 2015/0196920 A1 Jul. 16, 2015

Related U.S. Application Data

(60) Provisional application No. 61/927,191, filed on Jan. 14, 2014.

(51) Int. Cl.
*G01M 1/38* (2006.01)
*G05B 19/042* (2006.01)
(Continued)

(52) U.S. Cl.
CPC .............. *G05B 19/042* (2013.01); *B09B 3/00* (2013.01); *C05F 17/0264* (2013.01); *Y02P 20/145* (2015.11); *Y02W 30/43* (2015.05)

(58) Field of Classification Search
CPC ................................ G05B 19/042; B09B 3/00
(Continued)

(56) References Cited

U.S. PATENT DOCUMENTS 5,537,126 A * 7/1996 Kayser .................. G06Q 30/02
340/5.91
7,380,213 B2 5/2008 Pokorny et al.
(Continued)

OTHER PUBLICATIONS

Idris, Azni, Bulent Inanc, and Mohd Nassir Hassan. "Overview of waste disposal and landfills/dumps in Asian countries." Journal of material cycles and waste management 6.2 (2004): pp. 104-110.*
(Continued)

*Primary Examiner* — Satish Rampuria
(74) *Attorney, Agent, or Firm* — Kane Kessler, P.C.; Barry E. Negrin

(57) ABSTRACT

A food waste disposal system includes a waste disposal machine, a PLC, which controls the operation of the food waste disposal machine; at least one scale connected to a load cell indicator; door sensors; a minicomputer, a network connection, the minicomputer in data communication with an analytics cloud. The minicomputer includes SSL certificates; validates data communicated to the analytics cloud; stores the data in a centralized database and transmit a successful status code to the mini-computer after determining that the data is valid; and transmits an error code if the data validation fails, or another type of system error occurs; examines, aggregates and processes validated data; and determines the amount of waste dumped into the waste disposal machine based on door-open and door-closed states; and pre-aggregates a weight processed data by time or by digester to provide reporting to an end-user.

14 Claims, 7 Drawing Sheets

(51) Int. Cl.
  *B09B 3/00*    (2006.01)
  *C05F 17/02*   (2006.01)
(58) Field of Classification Search
  USPC .................................................. 700/275–306
  See application file for complete search history.

(56) References Cited

U.S. PATENT DOCUMENTS

| | | |
|---|---|---|
| 7,604,986 B2 | 10/2009 | Koh |
| 7,735,761 B2 | 6/2010 | Koh |
| 7,762,713 B2 | 7/2010 | Koh |
| 8,606,596 B1 | 12/2013 | Bochenko et al. |
| 2006/0235808 A1* | 10/2006 | Berry ............... G06Q 10/08 705/414 |
| 2007/0266251 A1* | 11/2007 | Busser ............ H04L 63/0823 713/176 |
| 2009/0139907 A1* | 6/2009 | Hollingsworth ....... G06Q 10/00 209/2 |
| 2010/0234665 A1 | 9/2010 | Soto |
| 2011/0137812 A1* | 6/2011 | Sherga ............... G06Q 40/04 705/317 |
| 2012/0047080 A1 | 2/2012 | Rodatos |
| 2012/0252107 A1 | 10/2012 | Self |
| 2013/0175373 A1* | 7/2013 | Morgan ............... B02C 23/00 241/36 |
| 2013/0323824 A1* | 12/2013 | Koh ................... C05F 17/0282 435/286.5 |
| 2014/0170735 A1* | 6/2014 | Holmes ............... G01N 21/07 435/287.1 |

OTHER PUBLICATIONS

Braber, K. "Anaerobic digestion of municipal solid waste: a modern waste disposal option on the verge of breakthrough." Biomass and bioenergy 9.1-5 (1995): pp. 365-376.*
Zheng, Wei, Scott R. Yates, and Scott A. Bradford. "Analysis of steroid hormones in a typical dairy waste disposal system." Environmental science & technology 42.2 (2007): pp. 530-535.*
Altin, S., et al. "Determination of hospital waste composition and disposal methods: a case study." Polish Journal of Environmental Studies 12.2 (2003): pp. 251-255.*
European Patent Appln. No. 15737795.3, extended European Search Report dated Sep. 28, 2017.
European Patent Appln. No. 15737795.3, supplementary European Search Report dated Oct. 17, 2017.

* cited by examiner

NETWORK CONNECTED WEIGHT TRACKING SYSTEM FOR A WASTE DISPOSAL MACHINE

CROSS-REFERENCE TO RELATED PATENT APPLICATIONS

This patent application claims priority from and the benefit of U.S. Provisional Patent Application Ser. No. 61/927,191, filed Jan. 14, 2014, entitled "NETWORK CONNECTED WEIGHT TRACKING SYSTEM FOR A WASTE DISPOSAL MACHINE", hereby incorporated by reference.

BACKGROUND

The application generally relates to a weight tracking system and method. The application relates more specifically to a food waste weight tracking system and method with data network connectivity to transmit weight tracking system information over a computer network, or cloud, for storage, tracking aggregation and sharing by a centralized computer system.

A food waste disposal system, such as an aerobic digester, may process up to 4.800 pounds of food waste every day, including virtually any kind of food waste including vegetables, fruits, meat, fish, poultry, grains, coffee grinds, egg shells and dairy products, with decomposition occurring within 24 hours. The food waste disposal system rapidly digests large volumes of food waste into a liquid effluent suitable for discharge into public sewer systems which is then transported to wastewater treatment plants where it is further digested. It is an ecologically-friendly solution for disposal food waste at its source.

Food waste disposal systems may be used to replace conventional waste disposal means, e.g., haulage of food waste to landfills, which is costly, inefficient and possibly harmful to the environment. Users of food waste disposal systems may want to maintain data associated with the food waste processed by and disposed of by the disposal system. What is needed is a method and system to accurately and automatically determine the amount of food waste processed by a food waste disposal system, after taking into account additives and potential sources of error.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

In one embodiment a food waste disposal system includes a waste disposal machine and a controller configured to control operation of the food waste disposal machine. One or more load cells measure a weight of the food waste disposal machine which includes the contents within the waste disposal machine. One or more door sensors sense a state transition of the door. A minicomputer is connected to the load cell. The minicomputer includes a network connection. The minicomputer is in data communication via the network connection with an analytics cloud. The food waste disposal machine validates data communicated to the analytics cloud from the minicomputer, and stores the validated data in a database for processing.

In another embodiment, a method is disclosed for determining a weight of food waste processed by a food waste disposal system, including collecting waste for disposal sensing a first door state change in response to an opening of a door of the waste disposal machine; transmitting a first door state change to a computing device; sensing a first weight of the waste disposal machine by weight scales, or load cells; transmitting the sensed first weight to the computing device; loading waste into the waste disposal machine; closing the door of the waste disposal machine; sensing a second door state change in response to the closing of the door; transmitting the door state change to the computing device; sensing a second weight of the waste disposal machine; transmitting the sensed second weight to the computing device; receiving via the computing device information about the door state change and the weight of the weight scales; and transmitting the received data over a computer network to an analytics cloud.

In still another embodiment, a method is disclosed for determining a weight of food waste processed by a food waste disposal system using a unique machine identifier. The method includes sorting a plurality of data records chronologically, by applying date and time stamps; marking the data records in response to a transition in a door state status from open to closed and from closed to open for each pair of door transition states; storing the associated weights of the waste disposal system.

Certain advantages of the embodiments described herein include the ability for the waste producer to translate the weight processed by the machine into cost savings, as waste processed locally on-site by the waste disposal machine offsets costs associated with a vendor or $3^{rd}$ party to transport waste, which is typically charged by weight.

Further, the waste producer can track other metrics that may be useful to the waste producer's business, for example, net new water created and improvements in the business' carbon footprint.

Yet another advantage is that waste treatment data may be aggregated across locations and regions if, e.g., the waste producer owns or manages multiple waste disposal units.

Alternative exemplary embodiments relate to other features and combinations of features as may be generally recited in the claims.

DETAILED DESCRIPTION OF THE EXEMPLARY EMBODIMENTS

Figure 1:
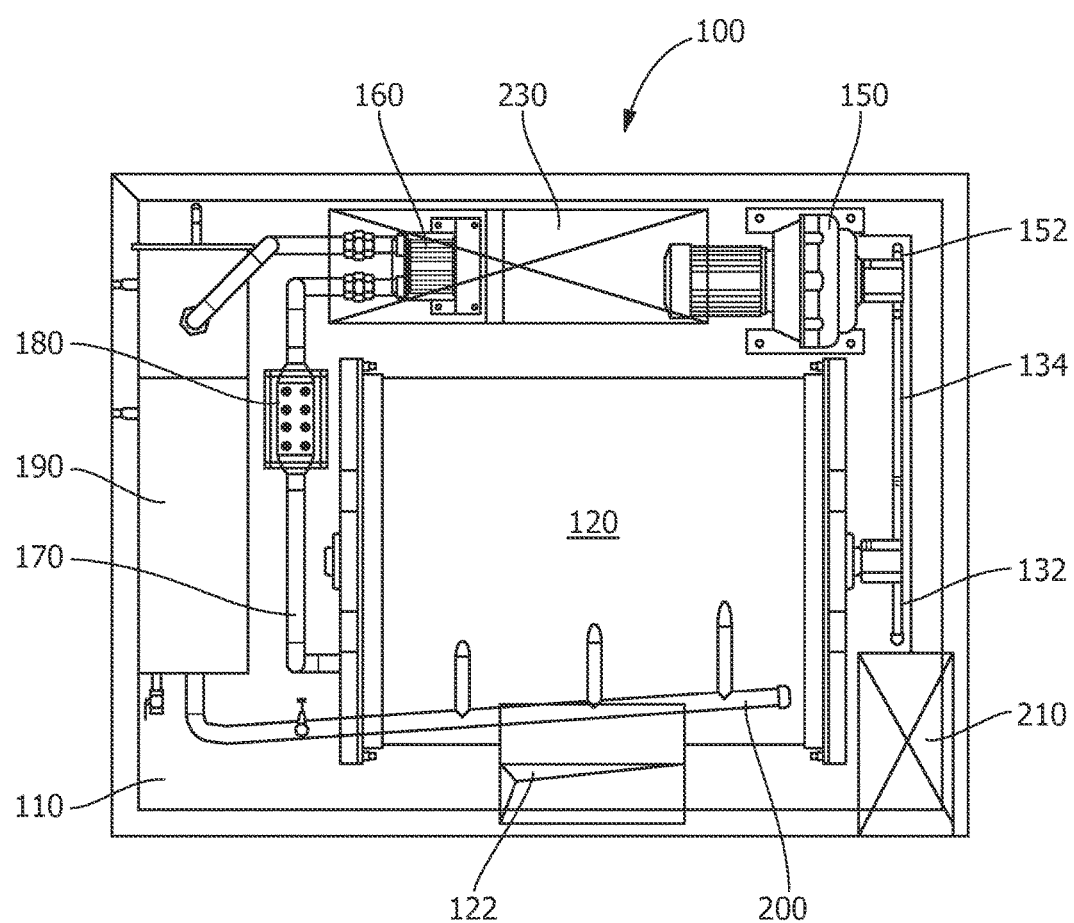
FIG. 1 shows a plan view of an exemplary organic waste disposal machine.
Figure 2:
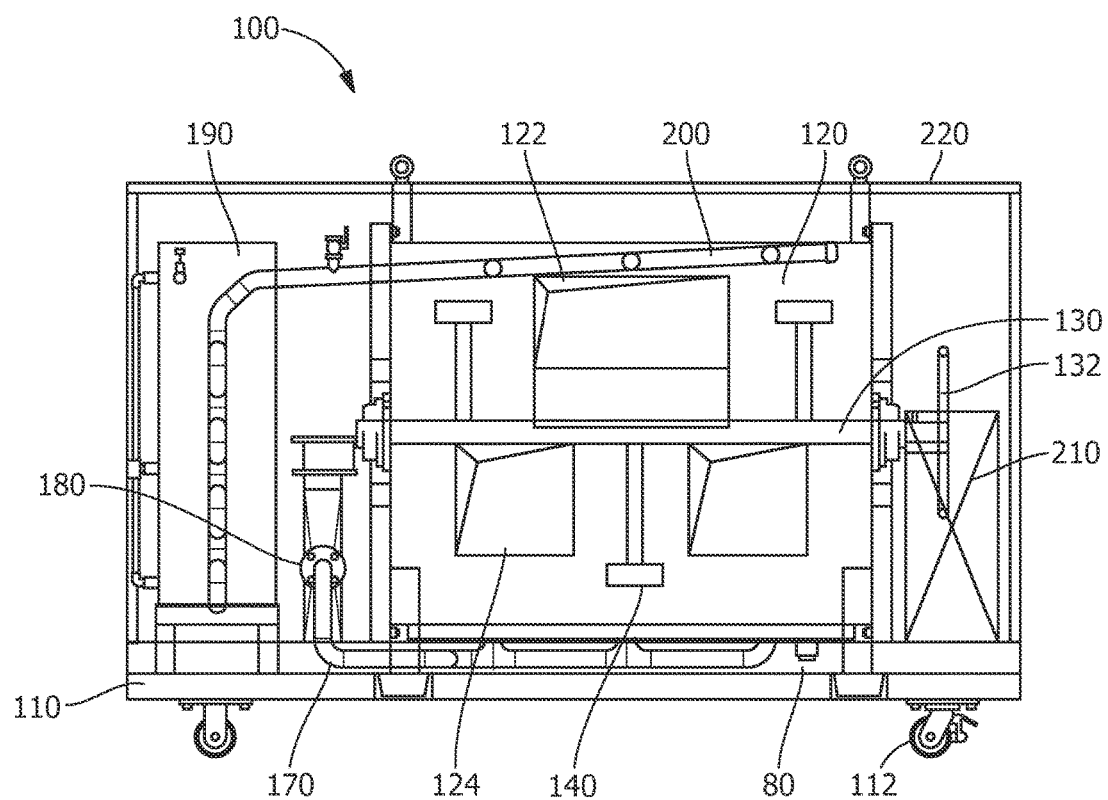
FIG. 2 shows a front view plan view of the organic waste disposal machine of FIG. 1.
Figure 3:
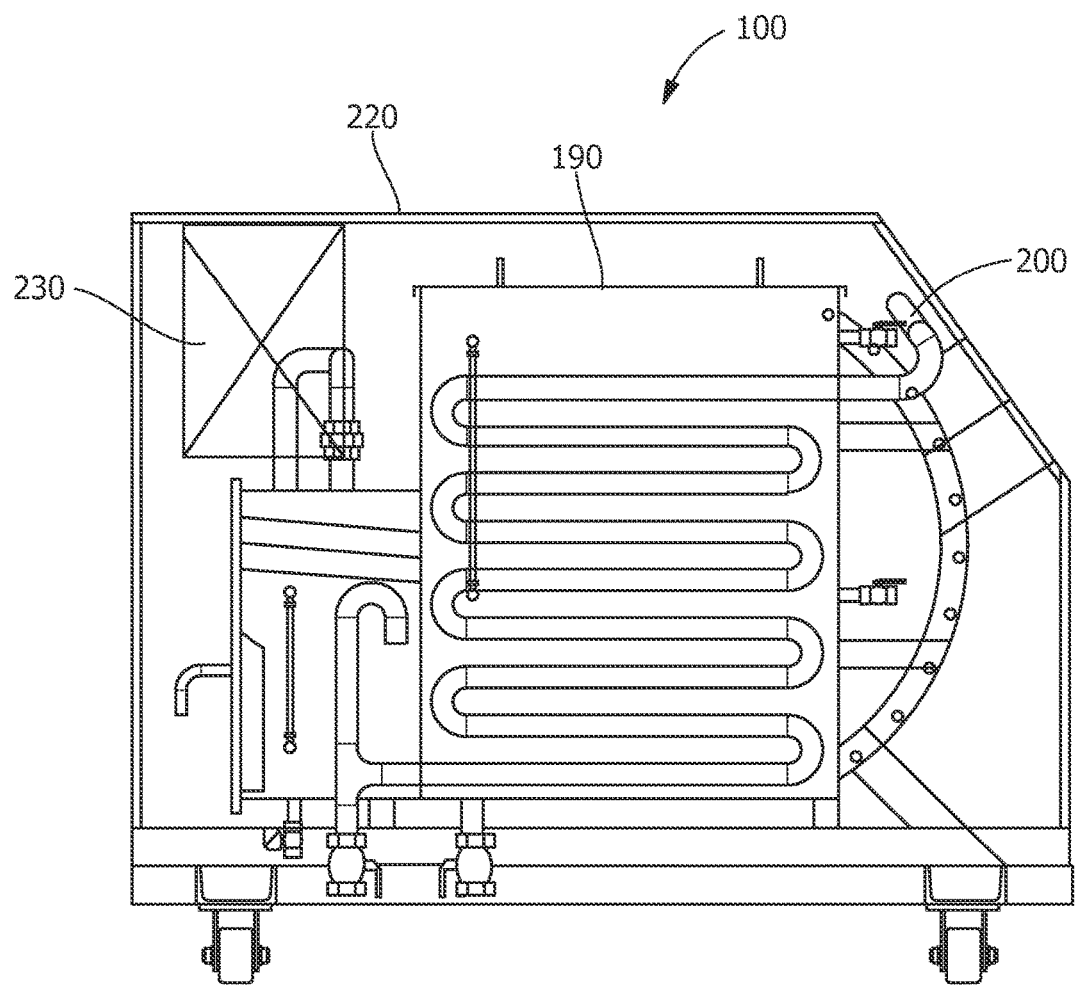
FIG. 3 shows a left side view of the organic waste disposal machine of FIG. 1.

Referring to FIGS. 1-3, an organic waste disposal machine 100 according to a first embodiment of the present invention includes a base frame 110, a shell casing 120, a shaft 130, an arm blade 140, a driving motor 150, a ring blower 160, an air pipe 170, a pre-heater 180, a condenser 190, a steam pipe 200, and a control box 210. There are further provided a cover 220 and a chiller 230. The base frame 110 supports the shell casing 120, a cylindrical structure in which an organic waste decomposition occurs by microorganism, *actinomyces bovis*, which is a kind of special microorganism that is inserted into shell casing 120 for decomposing an organic waste. Shell casing 120 also includes an input door 122 and a discharge door 124. A shaft 130 is rotatable at a center portion of shell casing 120. A shaft gear 132 is engaged to an end portion of shaft 130. A chain 134 is connected between shaft gear 132 and a motor gear 152 of a driving motor 150 for driving shaft 130.

An arm blade 140 is formed of a plurality of agitating or crushing members connected to an outer surface of shaft 130 for agitating and crushing organic waste placed in the shell casing. A driving motor 150 provides a rotational force to the shaft 130 when a voltage is applied. Arm blades 140 agitate and mix the organic wastes and microorganism in the shell casing 120. A ring blower 160 supplies air into shell casing 120. The microorganism used for an organic waste decomposition is aerotropic bacteria, so that air is needed to be continuously supplied when the organic wastes are decomposed. The ring blower 160 continuously supplies air into shell casing 120 in stable manner. An air pipe 170 connects ring blower 160 and a lower portion of the shell casing 120. The air pipe 170 passes air generated by ring blower 160 to shell casing 120. A pre-heater 180 supplies air heated to a predetermined temperature at which the *actinomyces bovis* properly decomposes an organic waste, into the interior of shell casing 120, so that it is possible to increase a decomposition efficiency of the organic waste and decrease time required for the decomposition. A condenser 190 liquefies vapor discharged from decomposed organic waste in shell casing 120. A steam pipe 200 provides a passage through which vapor generated by the decomposed organic waste flows to the condenser 190. A cover 220 protects all elements including shell casing 120.

A control box 210 controls the driving time and operation intervals of the driving motor 150, the ring blower 160, and the pre-heater 180 based on a user's selection or a previously set mode. The control box 210 may include a mode selection switch, a ring blower switch and a driving motor switch.

Figure 4:
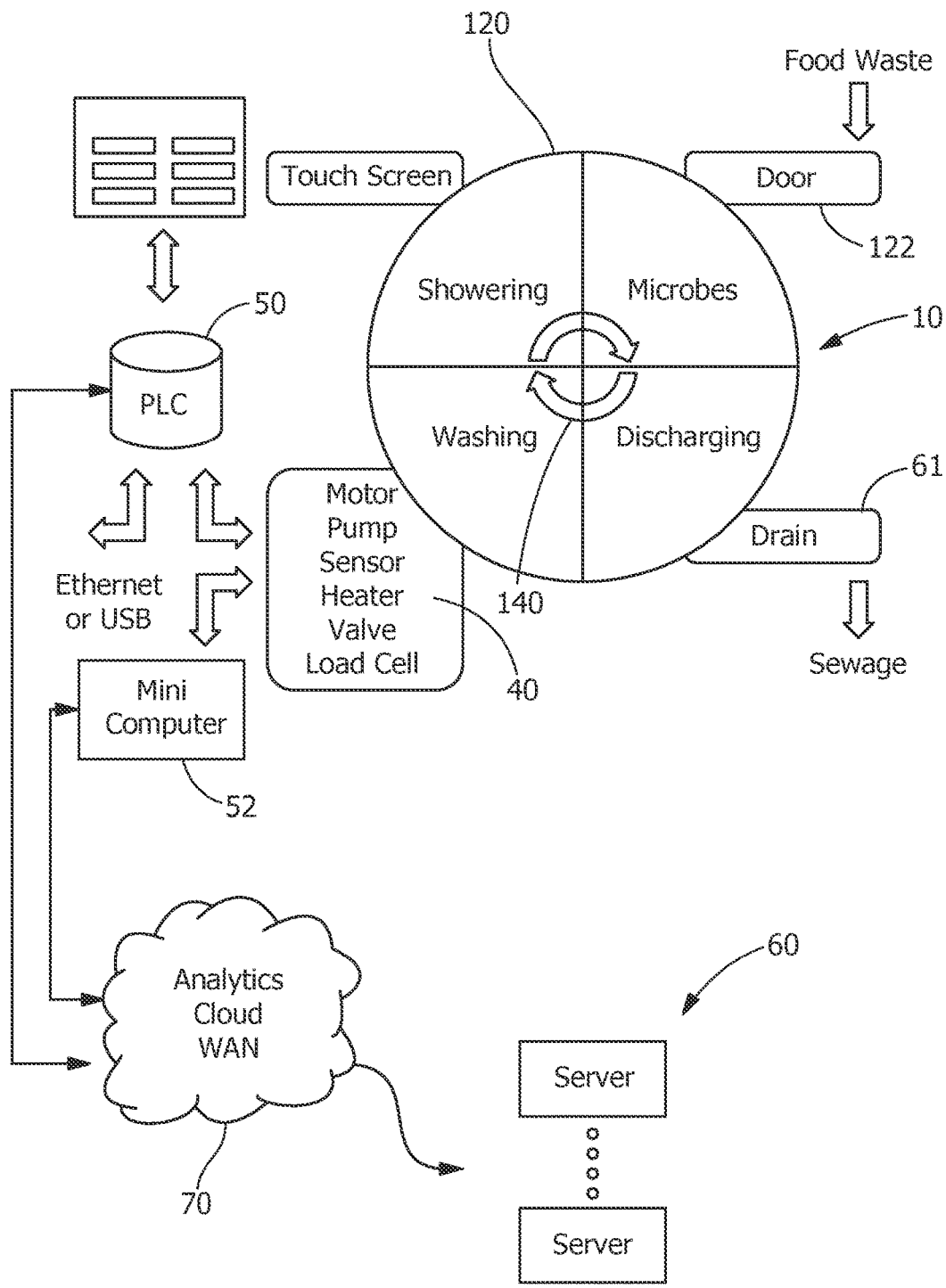
FIG. 4 shows an exemplary schematic diagram of the operation of the waste disposal machine.

Referring next to FIG. 4, a block diagram depicts the operation of the waste disposal apparatus operated by the control device of the present invention. Above-described operation of the apparatus 100 is performed by a control device comprising an input means, a processor and a memory device. Preferably, a touch screen is used as an input means and a display device. The hot water tank 40 is equipped with heaters to heat up water and the hot water in the tank 40 is used to conductively heat the mixing basin 10. Heating and maintaining the temperature of the mixing basin 10 is very important for the operation of the apparatus 100 because the activity of microbes is known to be the best at a certain temperature level. Micro-organisms are the most active at 37-42° C. If the temperature of the mixing basin 10 is higher or lower than this range, micro-organism activity drops quickly, resulting in low performance of the apparatus. Once food waste is placed into the mixing basin 10 and the temperature of the mixing basin reaches a predetermined level, preferably at around 15° C., the agitator 140 begins rotating to mix the food waste. Then, microbes in the microbe tank are periodically sprayed onto the food waste through spray nozzles The microbes decompose protein, fat, sugar, fatty acids, and cellulose in the food waste. By the decomposition of food waste by microbes, leachate is generated and collected in the drain water tank, and then, it is periodically discharged out of the apparatus through a drain pipe 61.

The apparatus 100 further comprises a cleansing device to clean the mixing basin and the drain water tank using high-pressure water and air. After complete decomposition of the food waste, to clean the mixing basin 10 and the drain water tank, hot water in the hot water tank 40 is sprayed at a high speed into the mixing basin 10 through spray nozzles and into the drain water tank through the drain tank spray nozzles. Then, high pressurized air is supplied into the mixing basin 10 to blow down water therein down into the drain water tank to be discharged out of the apparatus 100.

The food waste disposal system unit 100 may be, e.g., a food waste disposal system described in U.S. Pat. No. 7,735,761, U.S. Pat. No. 7,762,713 and U.S. application Ser. No. 13/304,516, which patents and patent application are hereby incorporated by reference.

FIG. 2 is a block diagram depicting the operation of the apparatus operated by the control device of the present invention. Above-described operation of the apparatus 100 is performed by a control device comprising an input means, a processor and a memory device. Preferably, a touch screen is used as an input means and a display device.

Waste disposal system or machine 100 may be located locally at the waste producer's site. A waste producer may be, e.g., a grocery store or distribution warehouse, a restaurant, a prison, a hospital, or other large food service business. Machine 100 contains a door 122 that may be opened and closed, and is operable to place waste into machine 100. Waste machine 100 processes and breaks down the waste and converts it into an effluent that may be safely pumped into the sanitary drains connected to external sewage ducts. As described above the waste disposal machine may be configured to perform aerobic digestion. In one embodiment a combination of wood chips, water, and waste provide a habitat for microorganisms that "eat" and "digest" organic waste (food) that is placed into the waste disposal machine. The by-product of such digestion is effluent that can be safely discharged down a commercial drain.

While an aerobic digester is one exemplary embodiment of a waste disposal machine, it will be appreciated by those skilled in the art that the disclosure is not limited to any specific waste disposal technology.

Waste disposal machine 100 may contains two or more load cells 80, which scales are typically connected to a load cell indicator 80. The load cell indicator 80 continuously polls the weight on the load cells, which represents the weight of the waste disposal machine, including the waste inside. Waste disposal machine also contains a Programmable Logic Controller (PLC) 50 (FIG. 4). The programmable logic controller may be an embedded computer that is typically used to run industrial equipment, such as the waste disposal machine. In one embodiment, the PLC controls the operation of waste disposal machine 100, performing such functions as controlling motors (not shown) used to spin the habitat, or containment vessel, in which the waste is processed, controlling water rinse cycles for the microorganisms, turning the machine off in response to excess waste being placed into machine 100, and discharging deodorizer on a predetermined interval. PLCs provide reliable and time-sensitive operation in a harsh environment. While PLCs are capable of controlling the operation of the machine, they not customarily used for data tracking.

A miniaturized computer may be embedded with each waste disposal machine. The mini-computer 52 (FIG. 4) may be directly interconnected with the weight tracking equipment, e.g., the load cell or a load cell indicator 80, other sensors, e.g., door position sensors, and/or to the PLC. The data interconnection is typically through a wired networked connection, such as an RS/232 serial cable or an Ethernet cable, although wireless networking may also be used. The mini-computer gathers information associated with waste disposal machine 100, e.g., weight, state of the door, etc., on a regular predetermined time interval. In one embodiment, the predetermined time interval may be, e.g., one second. This data is tracked and transmitted over a data network to an analytics cloud 60, as discussed below, on a predetermined interval, e.g., every 30 seconds, or when an interesting change of system state occurs, e.g., when the door state changes from "Open" to "Closed"). The data on the mini-computer may be cached so that it can be buffered and retransmitted at a later date in the event of a network communication outage.

The analytics cloud 60, or servers, stores and accesses data and programs over the Internet instead a local computer hard drive. In one embodiment a set of computers, or servers 60, may be interconnected via a wide area network or WAN 70, e.g., the Internet, that receive the data transmitted by the mini-computers embedded into the waste disposal machines. After the data is received by servers 60, the data is stored into a database system. The data may be processed and aggregated for later presentation to an end user (not shown). End users may use an Internet-connected computer equipped with a web browser to view the status and data transmitted from all of waste disposal machines communicating with servers 60. Typically, servers on the cloud 60 are offered as a "Software as a Service" or "Cloud Based Computing" solution, where the end-user rents the servers as a service. However, an end-user may operate its own servers with the software disclosed herein.

Method of Operation

Figure 5:
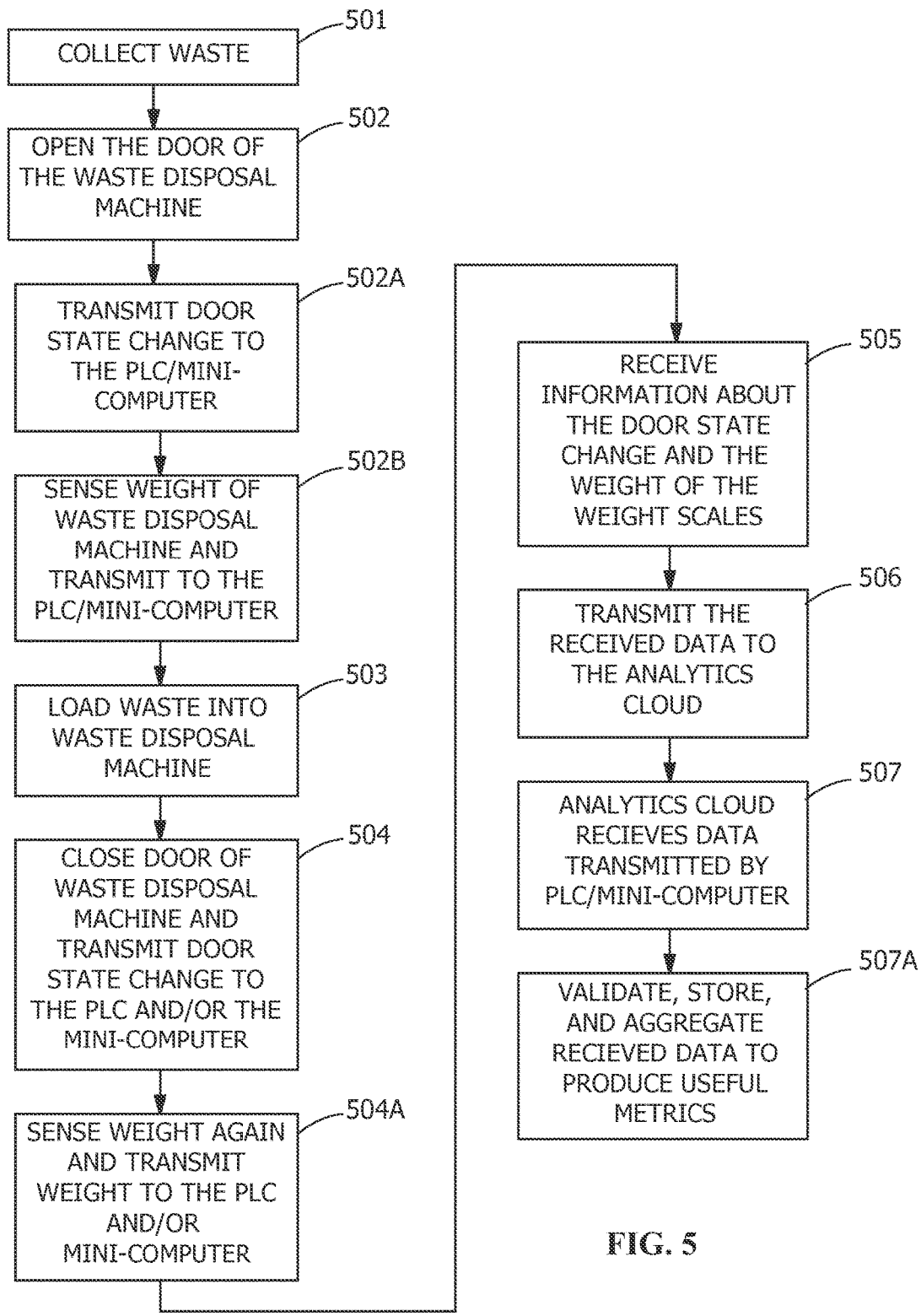
FIG. 5 shows an exemplary workflow diagram of one embodiment of the method.

Referring to FIG. 5, an exemplary flow diagram of one embodiment of the method is shown. A waste disposal machine sits in the receiving area of a large grocery store. Throughout the day, employees place waste into the waste disposal machine. The following steps occur whenever waste is disposed:

At step 501 an employee collects waste. Typically waste is stored in containers so that they can be dumped into the disposal machine in large quantities.

At step 502 the employee opens the door of the waste disposal machine.

At step 502A, the door state change is transmitted to the PLC and/or the mini-computer.

At step 502B, the weight is sensed by weight scales, or load cells, and the weight is transmitted to the PLC and/or the mini-computer.

At step 503 the employee loads waste into waste disposal machine 100, which increases the weight load of the machine.

At step 504, when finished loading waste into, the employee closes the door of the waste disposal machine and the door state change is transmitted to the PLC and/or the mini-computer.

At step 504A, the weight is again sensed by the weight scales and transmitted to the PLC and/or the mini-computer.

At step 505 the PLC and/or mini-computer receives information about the door state change and the weight of the weight scales. This information may be received directly from the door sensors on the machine and the weight scales' load cell indicator or the mini-computer may query the PLC for this information in cases where the mini-computer is not directly connected to these peripheral devices.

At step 506 the mini-computer transmits the received data over a computer network to the analytics cloud 70. Information may be transmitted over the Internet or WAN using communications protocols, e.g., HTTP (Hypertext Transfer Protocol) over SSL (Secure Sockets Layer) or TLS (Transport Layer Security) to provide secure and reliable data transmission. It will be appreciated that any communication protocol may be used to transmit data between waste disposal machine PLC or minicomputer and servers. The mini-computer transmits information such as the door state, the weight of waste disposal machine 100, a unique sequence of characters, i.e., an identifier code, used to uniquely distinguish the machine, the date/time of the event, and optionally, other metadata that may be captured from the machine including but not limited to, water meter data, temperature data, power meter data, etc.

At step 507 the Analytics Cloud receives the data transmitted by the waste disposal machines.

Finally, at step 507A, the received data may be validated, stored, and aggregated to produce useful metrics, such as weight processed, cost savings, etc.

In general, the waste disposal system configuration will always contain the following types of equipment:
1. A waste disposal machine;
2. A PLC located inside the waste disposal machine, which controls the operation of the waste disposal machine;
3. Multiple scales connected to a Load Cell Indicator;
4. One or more door sensors;
5. A minicomputer that has a network connection to the Internet.

While the components of the waste disposal system configuration are generally the same, there may be various embodiments of connection configurations as described below.

In a first exemplary embodiment a mini-computer may be connected to the PLC. In this embodiment, the door sensors and the weight scales may be connected to the PLC. The PLC reads the weight scale data and responds to door sensors status signals to control and operate the waste disposal machine. The minicomputer queries the PLC to see the latest machine state, e.g., the door status and weight last read by the PLC. In one exemplary embodiment the connection between the PLC may be made with a serial RS-232 connection, by way of example, as other connection technology may be used between the PLC and mini-computer, including but not limited to Ethernet, Wi-Fi, USB, etc.

In a second exemplary embodiment, a mini-computer may be directly connected to peripheral devices. In this embodiment, the door sensors and weight scales may still be connected to the PLC, e.g., as the PLC still needs to read these devices to control and operate the machine. However, the mini-computer may also be directly connected directly to peripheral devices, i.e., the weight scales and the door sensors. In this configuration, the Mini-computer directly reads the state of these devices without receiving the data through the PLC. In both exemplary system embodiments the minicomputer is able to read the state of the peripherals. In the second embodiment the minicomputer reads the state of the peripheral devices directly. In the first embodiment described above the minicomputer reads the state of the peripheral devices indirectly by going through the PLC.

The minicomputer performs the following actions on a routine basis, typically on a pre-configured interval, e.g., every second.

1. The minicomputer queries the weight and door state (either by querying the PLC, as outlined in the first embodiment described above, or by querying the devices directly, as outlined in the second embodiment above. Optionally, the minicomputer may query devices or the PLC for other machine state data, such as temperature, water meter, power meter, etc.

2. The minicomputer records the machine state data to the persistent storage on the minicomputer, with a timestamp. Examples of persistent storage can include a flat file, an indexed file, or a database. Persisting the data to storage allows the minicomputer to store, buffer, and recover from a power outage or failure.

3. The minicomputer checks for records that have been written to persistent storage and transmits the machine state (with the timestamp and an additionally unique machine identifier) to the analytics cloud 60 70. This data may be transmitted using standard networking protocols such as HTTPS (HTTP over SSL or TLS).

4. When the data has been verified as successfully transmitted (a successful status code or acknowledgement from the analytics cloud 60 70, the data can be successfully removed/deleted from persistent storage on the minicomputer.

5. If the data is unable to be successfully transmitted, the minicomputer will attempt to retransmit based on a configuration parameter on a regular interval until transmission is successful.

Table 1 outlines a typical data packet:

TABLE 1

| Data Field | Format | Example |
| --- | --- | --- |
| Unique Machine Identifier | String | BHA-ACME-CORP-013412 |
| Date/Time Stamp | Timestamp | 2013 Dec. 2 15:07:32Z4 |
| Door State | String | OPEN (or CLOSED) |
| Weight | Numeric | 432 |
| Water Meter | Numeric | 123456 |
| Power Meter | Numeric | 1234 |

Figure 6:
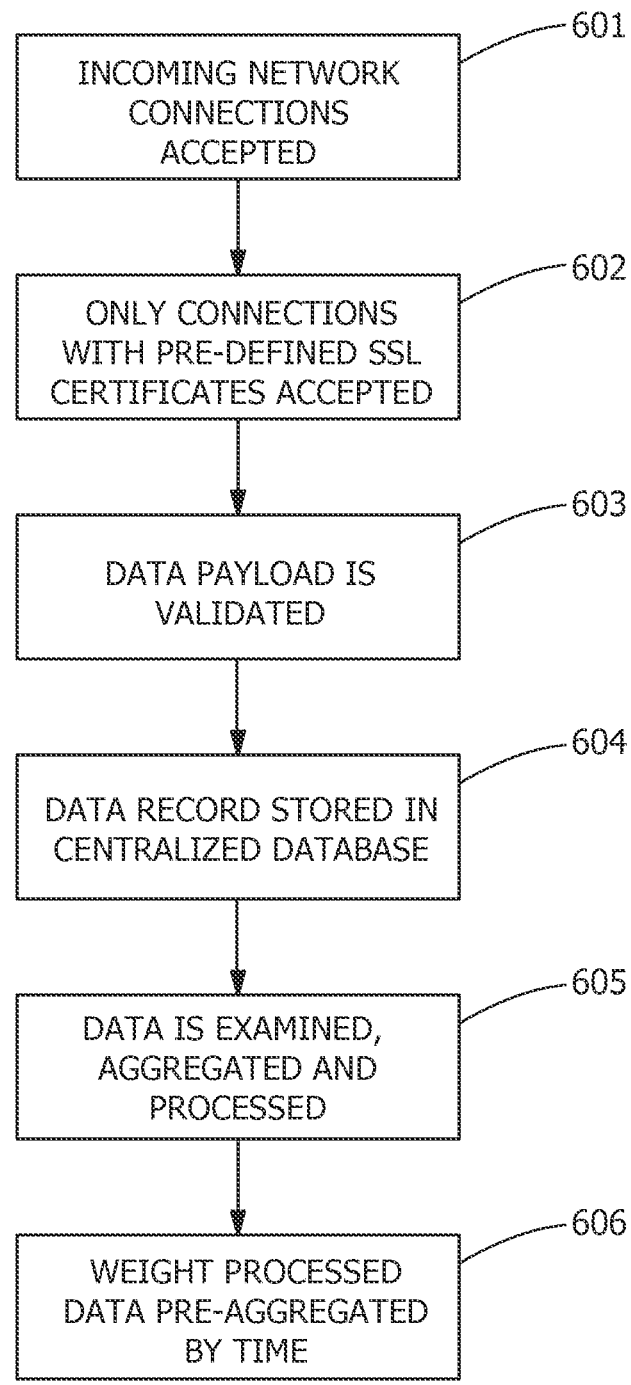
FIG. 6 shows an exemplary workflow diagram for the analytics cloud.

Referring next to FIG. 6, the analytics cloud 60 accepts incoming network connections from minicomputers housed inside of the waste disposal machines. Typically, these network connections would occur over well-established protocols such as HTTPS (HTTP over SSL or TLS). At step 601, analytics cloud 60 70 accepts incoming network connection from minicomputer 52. Next, the workflow proceeds to step 602, wherein, optionally, client-side certificate technology may be already embedded into protocols such as SSL/TLS, which allows the analytics cloud 60 to accept only connections from minicomputer installed with pre-defined SSL certificates. The certificate technology would prevent rogue devices from sending data to the analytics cloud 60. Next, at step 603, the data payload is validated. For example, incorrectly formatted or incomplete data packets would be identified and result in an error response. Machine identifiers that are unknown to the analytics cloud 60 may also result in an error response. If at step 603 data validation is successful, the workflow proceeds to step 604, in which the data record would be stored in a centralized database for further downstream processing. If at steps 603 and 604 data validation is successful and database writes is successful, then the analytics cloud 60 70 transmits a successful status code to the mini-computer. If data validation fails, or if any other type of system error occurs, the analytics cloud 60 transmits an error code back to the mini-computer. Next, at step 605, data is examined, aggregated, and processed on a regularly scheduled interval. The data is examined to determine the amount of waste dumped into the waste disposal machine between door-open and door-closed states. This algorithm is described below with respect to FIG. 7. At step 606, the weight processed data may be pre-aggregated by time (hourly and daily) as well as by digester (and perhaps a roll-up of locations) to provide fast, optimized reporting to the end-user. The weight processed data may also be pre-aggregated on a regularly scheduled interval.

Figure 7:
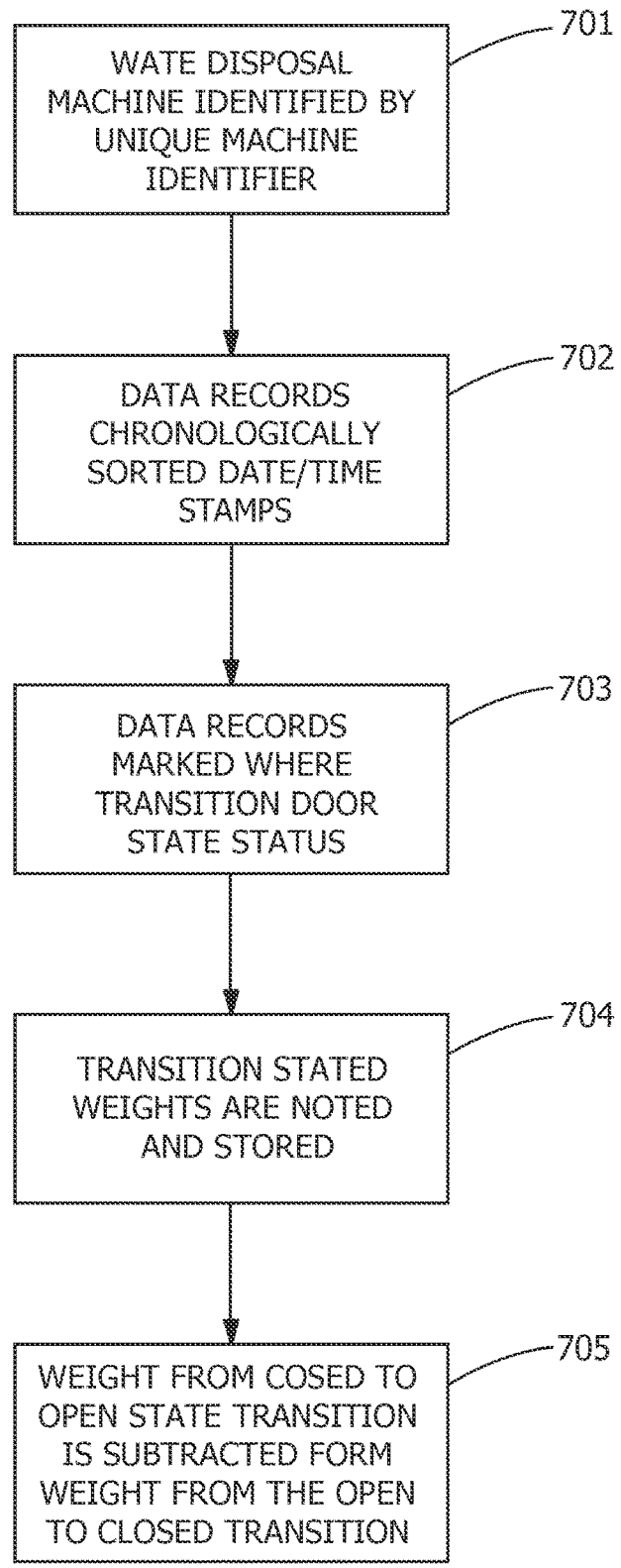
FIG. 7 shows an exemplary algorithm/procedure to derive the weight of the waste that was added to the Waste Disposal System.

Referring next to FIG. 7, an algorithm/procedure is performed with the detailed data packets transmitted by the Mini Computer and stored in the Cloud Analytics Database to derive the weight of the waste that was added to the Waste Disposal System. At step 701, for each known Waste Disposal System, identified by its unique Machine Identifier, all of the records in the database are queried using the unique Machine Identifier. It should be noted that the procedure described in this section is illustrative of one embodiment of the algorithm and is not necessarily optimized, e.g., for processing large volumes of data. At step 702 data records are sorted chronologically, using the date/time stamps. At step 703 data records are marked where there is a transition in door state status, i.e., from open to closed and from closed to open. Next, at step 704, for each pair of transition states, i.e., Closed→Open and Open→Closed, the weights are noted and stored. Specifically, during a Closed→Open transition the weight is saved based on the Open event. During an Open→Closed transition, the weight is saved on the closed event. At step 705 the weight from the Closed→Open state transition is subtracted from the weight from the Open→Closed transition. This weight, along with the Machine ID and the time of the transition, i.e., the date time/stamp, is stored in the database. See Table 2 for an exemplary data table layout.

TABLE 2

| Data Column | Format |
| --- | --- |
| Unique Machine Identifier | String |
| Weight Processed | Numeric |
| Date Time Stamp | Date/Timestamp |

Table 3 shows an example data processing stream.

TABLE 3

| Date/Time | Door Status | Weight |
| --- | --- | --- |
| 2013 Dec. 2 15:36:02 EST | Closed | 401 |
| 2013 Dec. 2 15:36:32 EST | Closed | 402 |
| 2013 Dec. 2 15:37:02 EST | Closed | 401 |
| 2013 Dec. 2 15:37:32 EST | Closed | 402 |
| 2013 Dec. 2 15:38:02 EST | Open | 402 |
| 2013 Dec. 2 15:38:32 EST | Open | 410 |
| 2013 Dec. 2 15:39:02 EST | Open | 422 |
| 2013 Dec. 2 15:39:32 EST | Open | 431 |
| 2013 Dec. 2 15:40:02 EST | Open | 438 |
| 2013 Dec. 2 15:40:32 EST | Closed | 439 |
| 2013 Dec. 2 15:41:02 EST | Closed | 438 |

Optionally, the system may choose to analyze the stream of weight data to see if there are fluctuations in weight before or after the key door state transitions. This may be optionally performed to ensure that a stable weight reading is processed and to avoid weight fluctuation caused by leaning on the waste disposal machine, temporarily storing materials on the waste disposal machine, or the addition of large amounts of water in the machine.

In this example, the system would subtract 402 from 439 to derive a weight processed of 37.

The following record would be stored in the database:

| Machine Identifier | Date/Time | Weight |
|---|---|---|
| BHA-ACME-CORP-013412 | 2013 Dec. 2 15:40:32 | 37 |

The system may also aggregate the weights stored in Table 2 by hour of day, day of year, and provide a roll-up of data by machine category or geography based on other associative relationships stored in the Analytics Cloud. The purpose of aggregation would be to provide the user with a highly performant reporting view in their web browser.

An End User may log into the Cloud Analytics system using a computer and remote access software (such as a web browser). The End User may log into the system by providing authentication credentials. The system validates the end user's credentials against its own authentication database. If authentication is successful, the system displays data about the waste disposal machines based on authorization rules established in the system. For example, a regional manager may be able to see more data than a store manager. The system would provide reports on usage by a variety of different time intervals including but not limited to, hourly, daily, weekly, month-to-date, year-to-date, etc. Additionally, the system may aggregate weight utilization data by any arbitrary collection of machines to provide aggregate weight processing reports based on geography, management line of responsibility, location demographics, etc.

Additionally, the system may extrapolate processed weights from the waste disposal machine into cost savings, environmental statistics, usage/goals, trends, and even monthly invoices.

Additionally, the system may provide alerts and notifications when machines are under-utilized, over-utilized, or not sending data, e.g., because of a network outage or machine malfunction. Alert notifications may also include other state information from the PLC, including (but not limited to) doors open too long (doors left open), low or high water temperatures, and low deodorizer tank levels to name a few.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the food waste disposal system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule-based logic and other logic to accomplish the various connection steps, processing steps, comparison steps and decision steps.

The invention claimed is:

1. A food waste disposal system comprising:
   a waste disposal machine;
   a programmable logic controller controls operation of the food waste disposal machine;
   at least one load cell to measure a weight;
   one or more door sensors;
   a minicomputer connected to and receiving weight data from at least one of i) the at least one load cell or ii) the programmable logic controller, the minicomputer comprising a network connection, the minicomputer in data communication via the network connection with an analytics cloud;
   the food waste disposal machine validating data communicated to the analytics cloud from the programmable logic controller or the at least one load cell via said minicomputer; and
   store the validated data in a database for processing,
   wherein the analytics cloud determines an amount of waste dumped into the waste disposal machine based on door-open and door-closed states and based on the entire weight of the machine corresponding to said states,
   wherein the analytics cloud aggregates data associated with the weight processed by the system, based on at least one of i) pre-determined time intervals, or ii) by a unique machine identifier associated with the food waste disposal system.

2. The system of claim 1, wherein the analytics cloud transmits a status code to the mini-computer in response to determining that the data is validated for purposes of at least one of i) properly identifying a source of the data or ii) properly formatting the data.

3. The system of claim 1, wherein the analytics cloud transmits an error code back to the mini-computer in response to determining that the data validation fails, or if any other type of system error occurs.

4. The system of claim 1, wherein the analytics cloud examines, aggregates and processes validated data on a predetermined interval.

5. The system of claim 1, wherein the analytics cloud aggregates weight processed data to provide reporting to an end-user.

6. The system of claim 1, wherein said minicomputer is also connected to door position sensor.

7. The system of claim 1, further comprising a pre-defined certificate, the certificate allowing the analytics cloud to accept connections exclusively from the minicomputer.

8. A method for determining a weight of food waste processed by a food waste disposal system, comprising:
   collecting waste for disposal, sensing a first door state change in response to an opening of a door of the waste disposal machine;
   transmitting a first door state change to a computing device adapted to cache data;
   sensing a first weight of the waste disposal machine by weight scales, or load cells;
   transmitting the sensed first weight to the computing device;
   loading waste into the waste disposal machine;
   closing the door of the waste disposal machine;
   sensing a second door state change in response to the closing of the door;
   transmitting the door state change to the computing device;
   sensing a second weight of the waste disposal machine;
   transmitting the sensed second weight to the computing device;
   receiving via the computing device information about the first and second door state changes and the first and second weights of the waste disposal machine; and
   transmitting the received data over a computer network to an analytics cloud,
   wherein the analytics cloud determines an amount of waste dumped into the waste disposal machine based on door-open and door-closed states and based on the entire weight of the machine corresponding to said states,
   wherein the analytics cloud aggregates data associated with the weight processed by the system, based on at least one of i) pre-determined time intervals, or ii) by a unique machine identifier associated with the food waste disposal system.

9. The method of claim 8, further comprising saving the first weight based on an open event upon sensing a closed-to-open transition of the door.

10. The method of claim 8, further comprising saving the second weight based on a closing event upon sensing an open-to-closed transition.

11. The method of claim 8, further comprising determining a differences in a total weight by subtracting the first weight associated with the closed-to-open transition, from the second weight associated with the open-to-closed transition.

12. The method of claim 8, further comprising storing the difference in the total weight in a database.

13. The method of claim 8, further comprising storing a machine identifier and a time of the transition associated with each event.

14. The method of claim 8, further comprising associating a date and time stamp for each weight associated with an opening or closing event of the door.

* * * * *